United States Patent
Zhang et al.

(10) Patent No.: US 12,265,824 B2
(45) Date of Patent: Apr. 1, 2025

(54) DATA COMBINATION DEVICE AND DATA COMBINATION METHOD

(71) Applicants: DIGIWIN CO., LTD., Shanghai (CN); DATA SYSTEMS CO., LTD., New Taipei (TW)

(72) Inventors: Tuo Zhang, Shanghai (CN); Xiaoliang Ma, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 3 days.

(21) Appl. No.: 18/336,057

(22) Filed: Jun. 16, 2023

(65) Prior Publication Data
US 2024/0303079 A1    Sep. 12, 2024

(30) Foreign Application Priority Data
Mar. 6, 2023 (CN) .......................... 202310210237.1

(51) Int. Cl.
*G06F 9/30* (2018.01)
*G06F 9/445* (2018.01)

(52) U.S. Cl.
CPC ........ *G06F 9/3005* (2013.01); *G06F 9/44526* (2013.01)

(58) Field of Classification Search
CPC .............................. G06F 3/005; G06F 9/44526
See application file for complete search history.

(56) References Cited

U.S. PATENT DOCUMENTS

2009/0157431 A1* 6/2009 Fournier ................ G06Q 10/00
705/3

* cited by examiner

*Primary Examiner* — Zachary K Huson
(74) *Attorney, Agent, or Firm* — JCIPRNET

(57) ABSTRACT

A data combination device and a data combination method are provided. The data combination device includes a storage device and a processor. The storage device is configured to store component instances. The processor is coupled to the storage device and is configured to receive a combining instruction. The processor parses a component description and data type in the combining instruction. The processor obtains a plurality of matching instances corresponding to the component description from the plurality of component instances. The processor packages the plurality of matching instances into package data.

14 Claims, 6 Drawing Sheets

DATA COMBINATION DEVICE AND DATA COMBINATION METHOD

CROSS-REFERENCE TO RELATED APPLICATION

This application claims the priority benefit of China application serial no. 202310210237.1, filed on Mar. 6, 2023. The entirety of the above-mentioned patent application is hereby incorporated by reference herein and made a part of this specification.

BACKGROUND

Technical Field

The disclosure relates to a hierarchical data management technology, and in particular relates to a data combination device and a data combination method.

Description of Related Art

Conventional business processing workflow requires designers with development software program to respectively write multiple sets of fixed workflows, and each execution step in the fixed workflow is required to be recoded into new logic according to different situations and scenarios. Therefore, conventional business processing workflow has issues of high development difficulty and the inability to achieve flexible adjustments and repeated usage.

SUMMARY

A data combination device and a data combination method are provided in this disclosure, in which corresponding component instances may be automatically matched according to the combining instruction, and multiple component instances may be packaged into executable package data.

According to an embodiment of the disclosure, the data combination device of the disclosure includes a storage device and a processor. The storage device is configured to store multiple component instances. The processor is coupled to the storage device and is configured to receive a combining instruction. The processor parses a component description and data type in the combining instruction. The processor obtains multiple matching instances corresponding to the component description from the component instances. The processor packages the matching instances into package data.

According to an embodiment of the disclosure, the data combination method of the disclosure includes the following operation. A combining instruction is received. A component description and data type in the combining instruction are parsed. Multiple matching instances corresponding to the component description are obtained from the component instances. The matching instances are packaged into package data.

Based on the above, the data combination device and data combination method of the disclosure may automatically match the corresponding component instance according to the combining instruction input by the user, package the component instance into executable package data, and simulate an execution of the package data to generate a simulated execution result.

In order to make the above-mentioned features and advantages of the disclosure comprehensible, embodiments accompanied with drawings are described in detail below.

DETAILED DESCRIPTION OF DISCLOSED EMBODIMENTS

Figure 1:
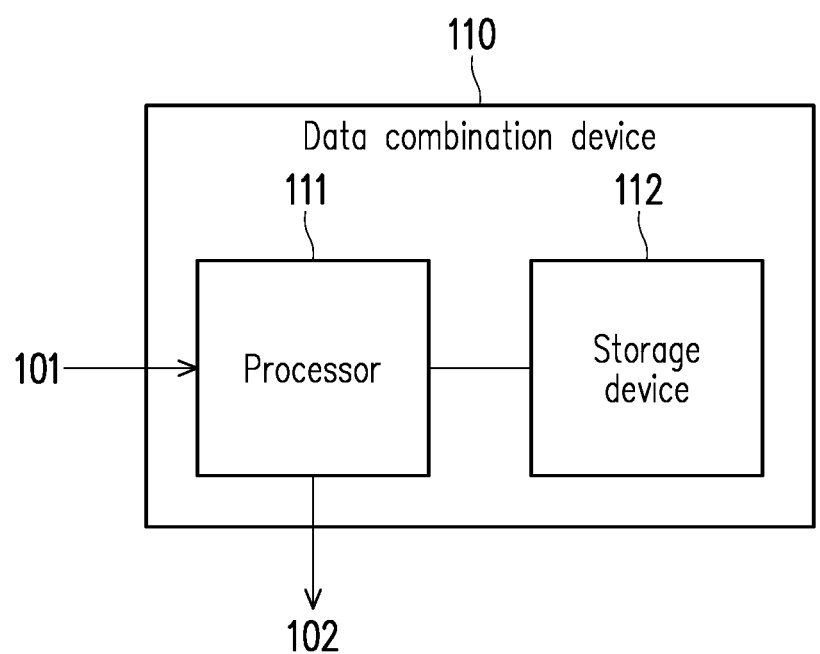
FIG. 1 is a circuit schematic diagram of a data combination device of an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

What should be explained first is that the data combination device and data combination method of the disclosure may simplify the design difficulty and complexity of business processing workflow, and improve the extensiveness and reusability of the application. The component instances described in the various embodiments of the disclosure may, for example, include at least one of a workflow instance, a task instance, a suite instance, and a part instance.

In this embodiment, the content of the component instance data is preset by the user or the system. A part instance refers to the basic logic operations that may be completed, such as data source parts (e.g., configured to call the application programming interface (API)), execution parts (e.g., logic data for executing scripts), control parts (e.g., logic data for determining whether a condition (e.g., whether a value is greater than 5 or whether a field includes "success") is met), storage parts, display parts (e.g., the data of style components on the page (e.g., field position, field color, button position and case quantity, etc.)), etc. In this embodiment, a suite instance refers to a processing logic formed of at least one part instance, and includes a link relationship (i.e., sequence) between at least one part instance. The link relationship may be in order of data source part, control part, and storage part. In other words, after a suite instance combines at least one part instance, more complex logic data may be executed. The suite instance may be a judgment suite formed by first calling data (i.e., the data source part) from the API, then retrieving a specific value (i.e., the execution part), and finally making a judgment (i.e., the control part) on the specific value.

A task instance includes at least one of a suite instance and a part instance. In other words, a task instance may be formed of at least one suite instance and/or at least one part instance. A task instance may be a logic unit that may complete specific business meanings, such as the task of generating a purchase requisition based on purchase requisition data or the task of converting a purchase requisition into a purchase order. A workflow instance includes at least one of a task instance, a suite instance, and a part instance, and a workflow instance means that compared with a task instance, more complex data processing may be completed. A workflow instance may be a service workflow or a processing workflow formed of multiple task instances, and the workflow instance is a business workflow such as a work order dispatch workflow, a purchase requisition conversion, and a recording workflow, etc.

A part instance includes data content such as data type, state, features, parameters, etc. Moreover, for different types of part instances, there are a series of corresponding processing logics in different states (i.e., data types), so the disclosure may package these part instances and logics as task instances, suite instances, or workflow instances. When packaging the data workflow, only the data about the core logic is required to be packaged (i.e., the data content related to the page style is omitted). The data combination device of the disclosure may automatically match the appropriate component instances and link relationships according to the combining instruction, and package the matching component instances and link relationships into package data. In this way, the disclosure greatly simplifies the complexity of developing a new processing workflow and improves the reusability of existing logic data, and may also generate more task instances or workflow instance for execution according to the adjustment of self-defined parameters when running executable data.

FIG. 1 is a circuit schematic diagram of a data combination device of an embodiment of the disclosure. Referring to FIG. 1, the data combination device 100 includes a processor 110 and a storage device 120. The processor 110 is coupled to the storage device 120. The data combination device 100 may also include an input device with actual circuit components, a user interface, a communication interface, or a data transmission interface, etc., so that the processor 110 may receive an instruction or a signal matching a request from a data source or an external device, or according to a user operation. In this embodiment, the processor 110 receives a combining instruction 101 and outputs a corresponding package data 102. In this embodiment, the data combination device 100 may be, for example, a personal computer, a workstation computer, or other electronic devices with data computing capabilities. In an embodiment, the data combination device 100 may also be integrated in a cloud server or a private server within an enterprise. In one embodiment, the data combination device 100 may be configured, for example, to realize an enterprise resource planning (ERP) system, and may execute multiple application programming interfaces (API) to call multiple task modules and task instances. In one embodiment, part instances, suite instances, task instances, and workflow instances refer to task logic (or referred to as programs) or task workflows configured to perform specific task functions according to business data. For example, the aforementioned may be configured to execute the task logic of generating the purchase order function according to the purchase order data, or for example, the aforementioned may be configured to execute the task logic of generating the purchase requisition function according to the purchase requisition data, and the disclosure is not limited thereto.

In this embodiment, the processor 110 of the data combination device 100 may include, for example, a central processing unit (CPU) or other programmable general-purpose or special-purpose microprocessor, a digital signal processor (DSP), an application specific integrated circuit (ASIC), a programmable logic device (PLD), or other similar processing circuits or a combination of these devices.

In this embodiment, the storage device 120 may realize a remote cloud storage service or a local data storage service. The storage device 120 may include a memory and/or a database, in which the memory may be, for example, a non-volatile memory (NVM). The storage device 120 may store related programs, modules, systems or algorithms for realizing various embodiments of the disclosure, so as to be accessed and executed by the processor 110 to realize the relevant functions and operations described in the various embodiments of the disclosure. The storage device 120 may also be configured, for example, to cache package data, part instances, and selected part instances described in various embodiments of the disclosure.

Figure 2:
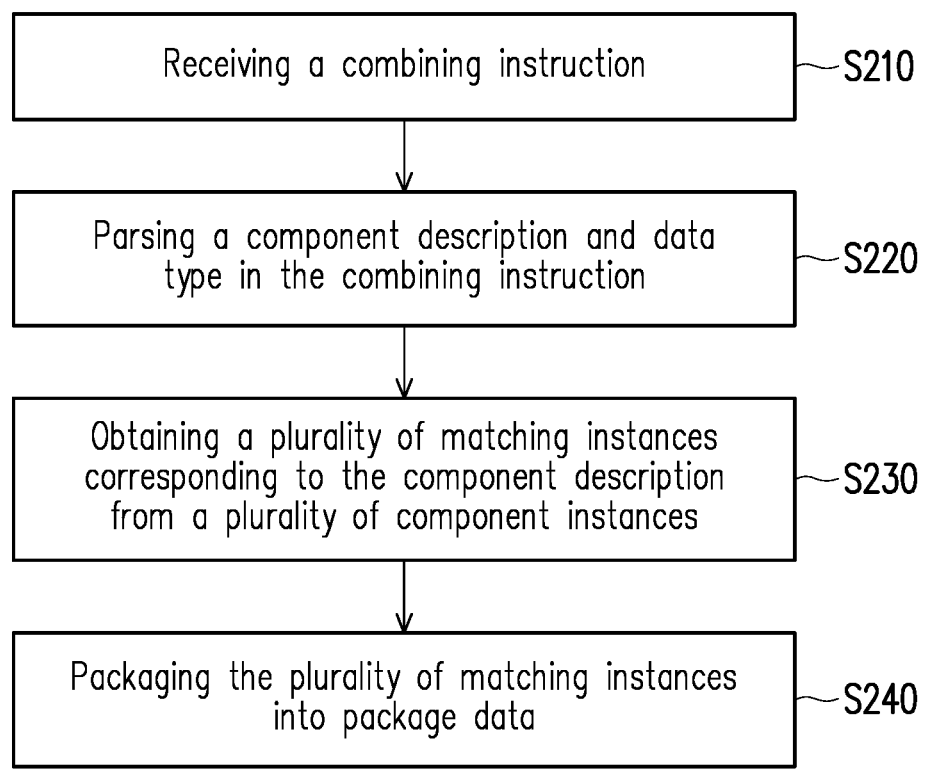
FIG. 2 is a flowchart of a data combining method of an embodiment of the disclosure.

FIG. 2 is a flowchart of a data combining method of an embodiment of the disclosure. Referring to FIG. 1 to FIG. 2, the data combination device 100 may perform the following steps S210 to S240. In step S210, the processor 110 may receive the combining instruction 101. In this embodiment, the processor 110 of the data combination device 100 may receive the combining instruction 101 from a data source. For this, the data source may be, for example, original business data or data obtained through an application program interface. Alternatively, the package data 102 may also be artificially set data. In another embodiment, the data combination device 100 further includes a data interface for receiving the combining instruction 101. The data interface may be set in the terminal device of the user, and then receives the combining instruction 101, matching instruction, and package output instruction of the user.

In one embodiment, the data combination device 100 further includes a display, which is set on the terminal device of the user and is configured to display execution results of multiple component instances and the package data 102, thereby improving the convenience of user operation. The combining instruction 101 include component descriptions and data types. The component description is at least one of workflow purpose (e.g., purchase requisition to purchase order conversion), selection of component instances (e.g., selecting component instance A, component instance B, and component instance C in sequence), multiple component definitions (e.g., purchase requisition processing component, approval component, and data review component), and data content.

In step S220, the processor 110 parses the component description and data type in the combining instruction 101. In this embodiment, the processor 110 parses the component description and data type to obtain a corresponding component instance list and component instance association relationship. In step S230, the processor 110 obtains multiple matching instances corresponding to the component description from the component instances. In other words, the processor 110 searches the storage device 120 for a component instance corresponding to the component description according to the parsed component description. For example, the component description may be "converting purchase requisition to purchase order, and reviewing purchase order content", and the data type is purchase requisition. Next, the processor 110 parses the component description into purchase requisition, conversion, purchase order, and approval. Therefore, the processor 110 may sequentially match matching instances from the storage device 120 according to the parsed component description. In this example, the matching instances may sequentially be: review purchase requisition part (e.g., API part), purchase order part, purchase requisition to purchase order task, and review judgment suite.

In an embodiment, the storage device 120 also stores a component description matching table. In addition, the component description matching table includes the description content of each component instance. In other words, the component description matching table is a comparison table between description content and component instances. In this way, the processor 110 may find multiple component instances matching the component description according to the component description matching table. In this way, a compiling module 121 may find the corresponding matching instance in the component description matching table according to each component description in the combining instruction 101.

In step S240, the processor 110 packages multiple matching component instances (i.e., matching instances) into package data 102. In this embodiment, the package data 102 refers to mapping routines and processing logic in the real world into the digital domain and packaging them into data. In this embodiment, the package data 102 may include a record data type field, a data feature field, and an original data field (the fields are described and realized by the corresponding coding language). In this embodiment, the package data 102 may also include recording environmental information and other information such as page style.

For example, the package data 102 includes the processing logic and execution data of the API call part instance (i.e., the data source part instance), the judgment part instance, and the execution part instance. Next, when the processor 110 executes the package data 102, the processor 110 sequentially executes the workflow of API calling (e.g., the purchase requisition call API) according to the package data 102, judgment according to the parameter value (e.g., determining whether the inventory of an original copy A is greater than 10), and execution of the corresponding judgment result (e.g., if the inventory is less than 10, output the purchase order information).

Figure 3:
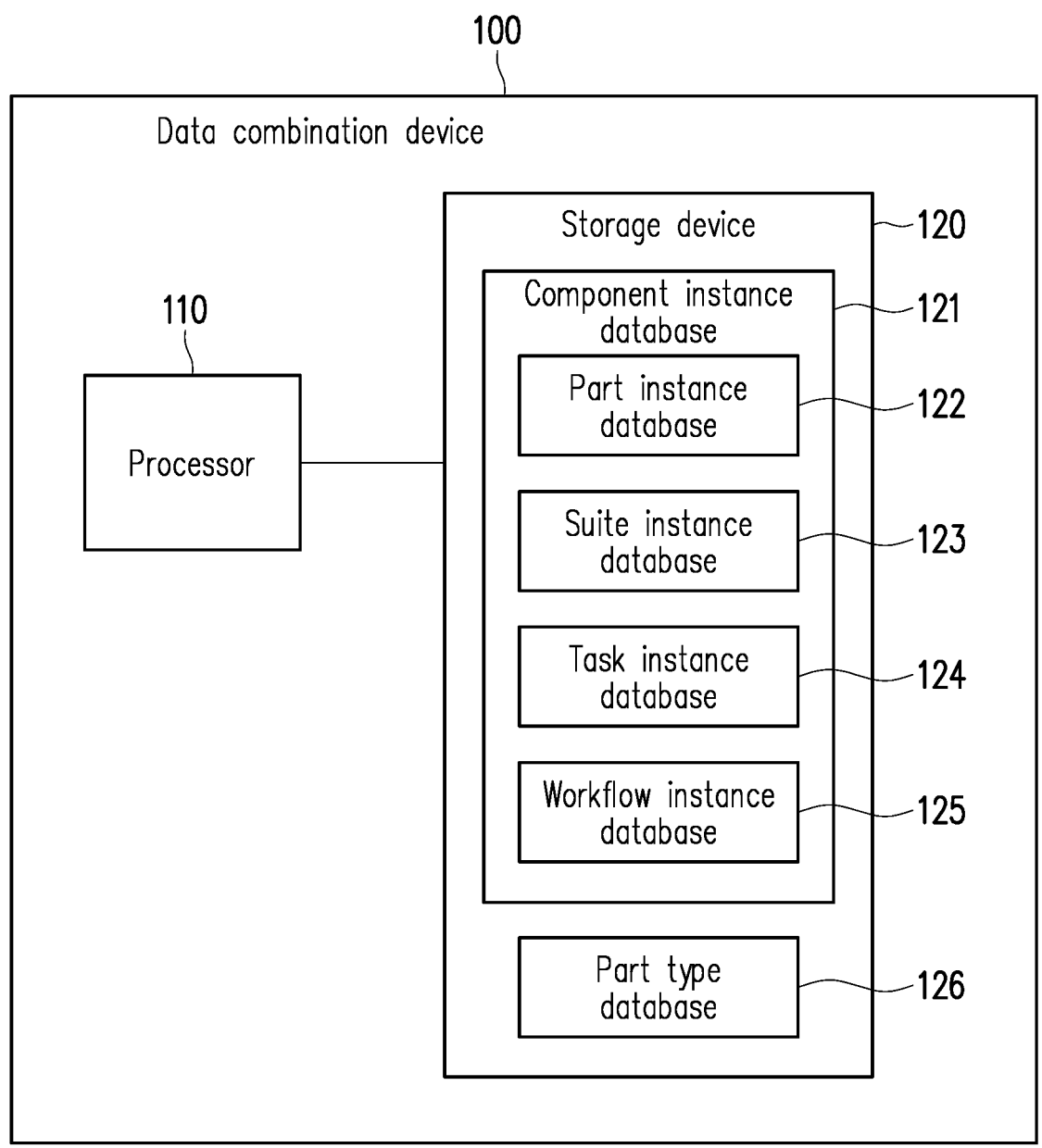
FIG. 3 is a module schematic diagram of a data combination device of an embodiment of the disclosure.

FIG. 3 is a module schematic diagram of a data combination device of an embodiment of the disclosure. As shown in FIG. 3, the storage device 120 stores a component instance database 121 and a part type database 126. The component instance database 121 includes a part instance database 122, a suite instance database 123, a task instance database 124, and a workflow instance database 125. The component instance database 122 stores multiple component instances. The suite instance database 123 stores multiple suite instances. The task instance database 124 stores multiple task instances. The workflow instance database 125 stores multiple workflow instances.

Figure 4:
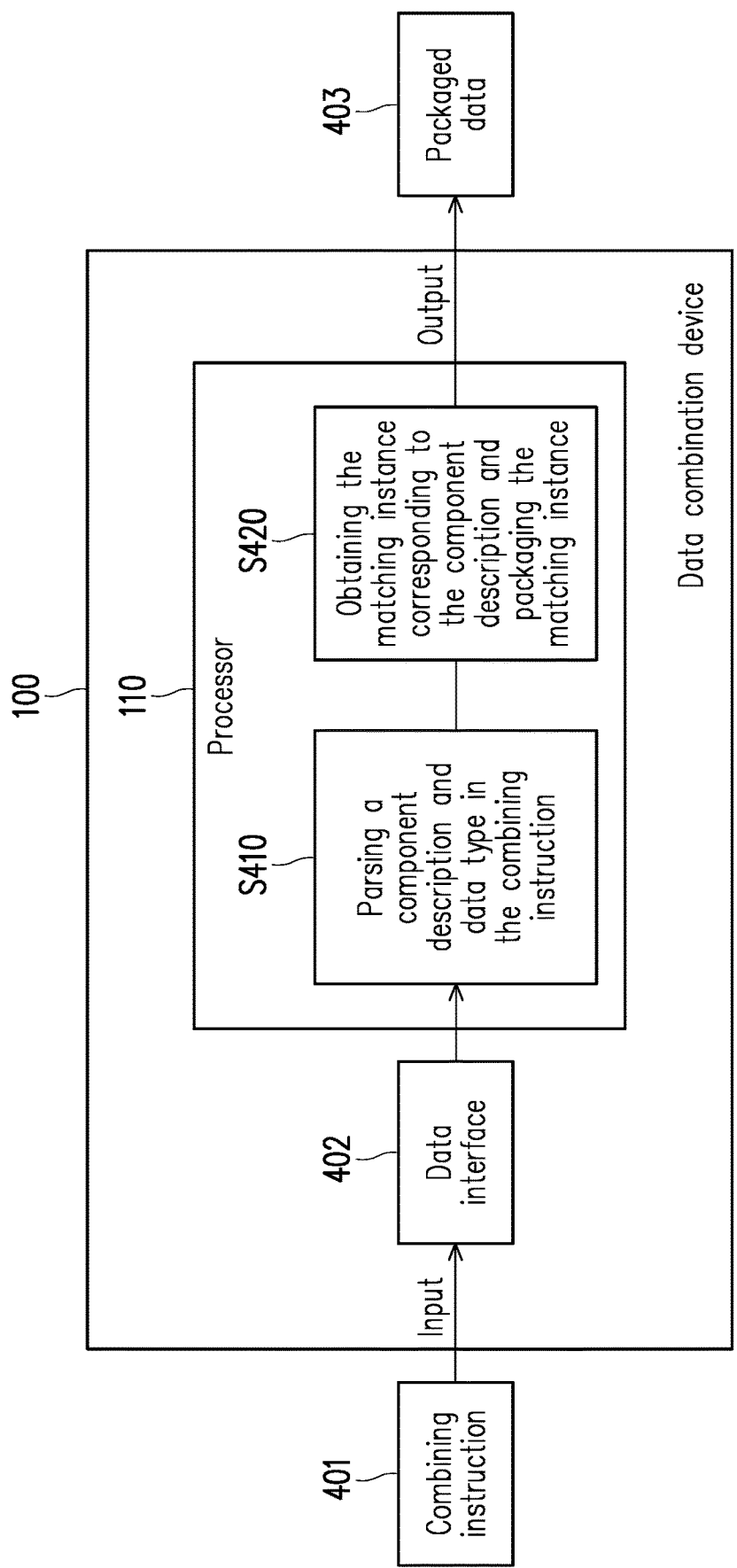
FIG. 4 is an execution schematic diagram of a data combination device of an embodiment of the disclosure.
Figure 5:
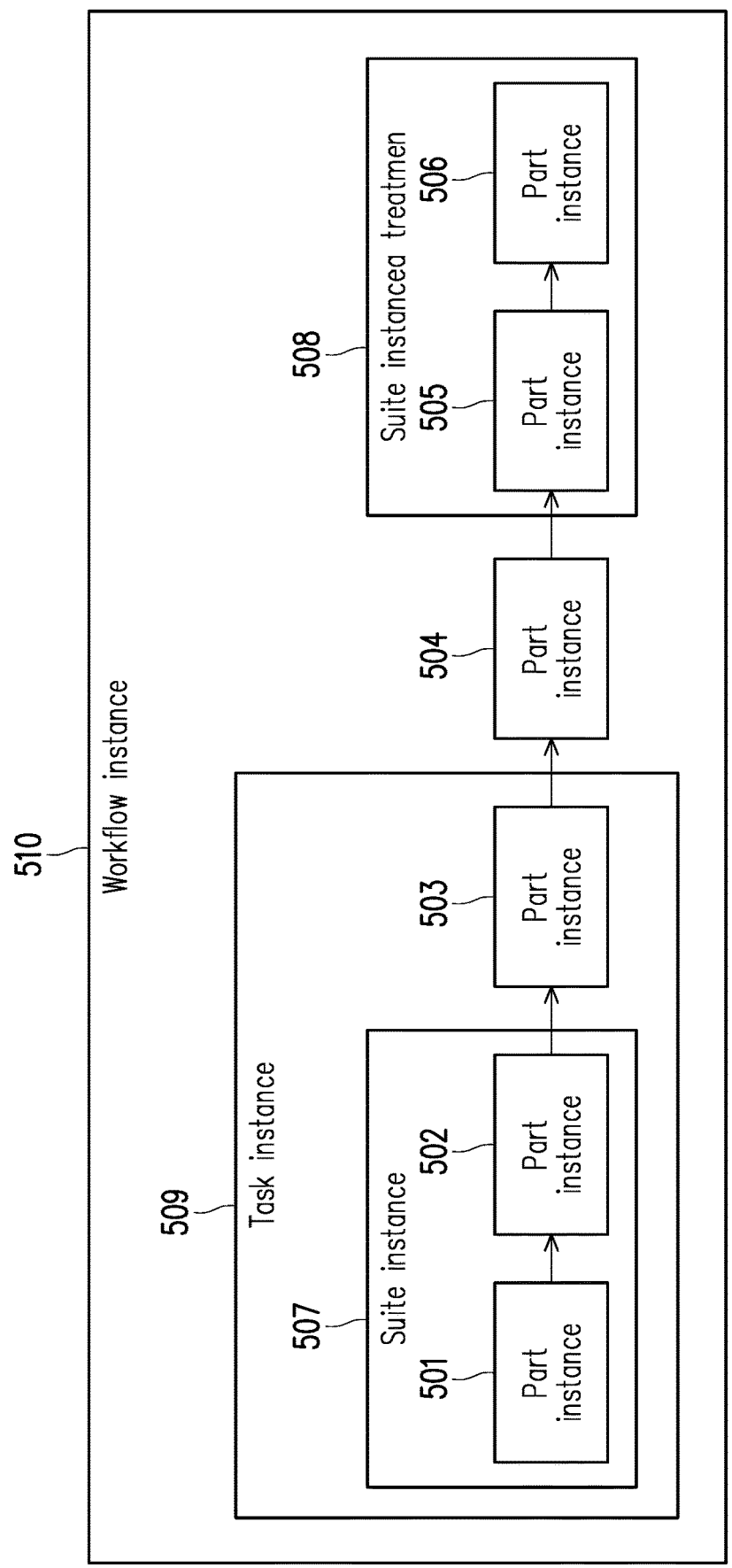
FIG. 5 is a schematic diagram of a workflow instance, a task instance, a suite instance, and a part instance in an exemplary embodiment of the disclosure.

FIG. 4 is an execution schematic diagram of a data combination device of an embodiment of the disclosure. FIG. 5 is a schematic diagram of a workflow instance, a task instance, a suite instance, and a part instance in an exemplary embodiment of the disclosure. Referring to FIG. 2 to FIG. 5, the data combination device 100 may further execute the following step S410 and step S420. In one embodiment, the data combination device 100 further includes a data interface 402, and the data interface 402 receives the combining instruction 401, in which the data interface 402 inputs the combining instruction 401 to the processor 110, the data interface 402 outputs the package data 403 and the execution result corresponding to the package data 403.

In other words, the processor 110 receives the combining instruction 401 through the data interface 402. In one embodiment, the data interface 402 is an application program interface 402 or a communication device. Next, the processor 110 executes step S410 to parse the component description and data type in the combining instruction 401.

In step S410, the processor 110 sequentially compares the component description and multiple component instances to obtain multiple matching instances of the workflow instance, task instance, suite instance, and part instance that match the component description. Specifically, part instances, suite instances, task instances, and workflow instances may all be called component instances. The processor 110 may package component instances into various business logics, and then perform different levels of packaging according to the combining instructions 401 of the user.

Next, in step S420, the processor 110 obtains a matching instance corresponding to the component description according to comparing the component instance and the component description in the storage device 120. In addition, the processor 110 packages the matching instance into package data 403. In this embodiment, the processor 110 outputs the package data 403 to the terminal device of the user through the data interface 402. In one embodiment, the processor 110 packages multiple matching instances and data types into package data 403. The data type is related to data of the industry domain. For example, the data types are order, purchase order, purchase requisition, attendance list, etc. Specifically, the storage device 120 also stores a data type processing table, which is a comparison table of data types and processing rules.

In one embodiment, the package data 403 includes a directional parameter. The directional parameter includes a node parameter and a link parameter. The node parameter is related to a node code, a node type, and a node program code. The link parameter is related to the link direction of the node (i.e., the previous node code and the next node code). For example, a part (part instance 501) may be a part instance that includes execution instructions. The part instances (501, 502, 503, 504, 505, and 506), suite instances (507, 508), task instance 509, and workflow instance 510 may be assembled with each other. Therefore, the user may select multiple part instances (501, 502, 503, 504, 505, and 506) to combine into a suite instance (507, 508) according to the current business scenario, or the user may select at least one part instance and suite instance to combine into a task instance 509.

As shown in FIG. 5, a workflow instance 510 includes a task instance 509 and a suite instance 508. In addition, a task instance 509 includes a suite instance 507 and a part instance 503. A suite instance 507 includes a part instance 501 and a part instance 502. A suite instance 508 includes a part instance 505 and a part instance 506. In this embodiment, the package data (102, 403) may be a workflow instance 510. Moreover, the directional parameter in the package data (102, 403) is the link direction between the part instance 501 and the part instance 502, and the sequence and link relationship among multiple component instances in the package data (102, 403). The link parameters is related to the link relationship between multiple matching instances in the package data (102, 403).

In one embodiment, multiple component instances are associated with program code, and each component instance of the component instances includes a component structure. In other words, component instances are constructed by program codes and correspond to different logical processes. The component structure includes definition data and link relationships of at least one of part instances, suite instances, task instances, and workflow instances. The definition data is the definition of each component instance, such as purchase requisition data, purchase order data, review suite, conversion part, judgment task, or delivery date confirmation workflow. For example, the definition data of the component structure in task instance A is part instance B, part instance C, and suite instance D, and the link relationship is the execution sequence among part instance B, part instance C, and suite instance D.

In one embodiment, the data combination device 100 is configured to execute the package data 403 to generate an execution result of the package data 403. In addition, the processor 110 may output the execution result through the data interface 402. In an embodiment, the processor 110 may also receive a creation instruction through the data interface 402. In addition, the processor 110 generates a new component instance according to the creation instruction, in which the processor 110 stores the new component instance in the storage device 120. For example, the user may create different new component instances according to the component instances and data types, such as data documents for purchase requisitions, API parts for converting purchase requisitions to purchase orders, and executable parts that support digital addition, subtraction, and multiplication operations.

For example, the part instances include API type, field name, bit address, method, message header (e.g., http header), message type, and message body. In the workflow of creating a new component instance, the user selects the part instance, and respectively inputs the data type and data content. The data type and data content may include obtaining logistics information, JSON, order 001, and other fields. In this way, when the processor 110 executes the package data, the processor 110 may execute the corresponding API processing logic, and then retrieve data information (e.g., purchase requisition information) from the corresponding address according to the self-defined parameters.

Figure 6:
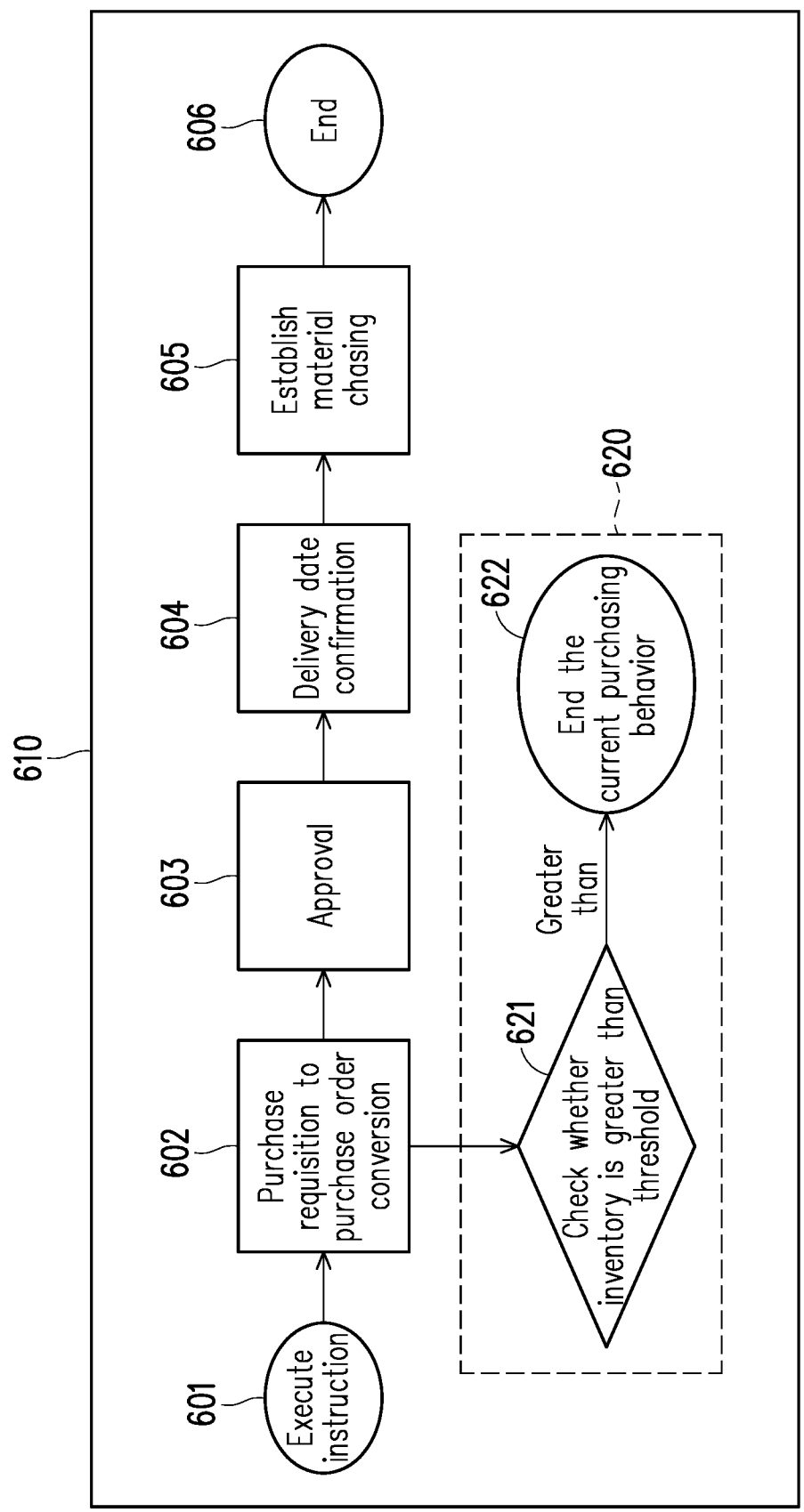
FIG. 6 is a schematic diagram of a matching instance and a matching plug-in instance according to an exemplary embodiment of the disclosure.

FIG. 6 is a schematic diagram of a matching instance and a matching plug-in instance according to an exemplary embodiment of the disclosure. The storage device 120 also stores multiple plug-in instances 620. The processor 110 obtains at least one matching plug-in instance corresponding to multiple matching instances from the storage device 120. The processor 110 combines the matching plug-in instance 620 into the package data according to the component description. Specifically, the plug-in instance 620 is a plug-in module of the component instance, and the plug-in instance 620 may be applied to the component instance by plugging and unplugging, thereby affecting the execution or display of the component. In this embodiment, the part 601, the purchase requisition to purchase order conversion task 602, the approval part 603, the delivery date confirmation part 604, the establish material chasing part 605, and the end part 606 may be combined into a purchasing workflow 610. In another embodiment, the part 601, the purchase requisition to purchase order conversion task 602, the approval part 603, the delivery date confirmation part 604, the establish material chasing part 605, the end part 606, and the plug-in instance 620 may also form a purchasing workflow 610. The plug-in instance 620 may be formed of multiple component instances, such as a judgment part instance 621 and an end part 622.

For example, the part 601 may be the execution instruction data that triggers the purchase requisition to purchase order conversion task, and then the purchase requisition to purchase order conversion task 602 may output the purchase order to the approval part 603 after converting the purchase requisition into a purchase order. Next, the delivery date confirmation part 604 confirms according to the purchase order data, and executes the establish material chasing part 605 after passing the confirmation. The judgment part instance 621 in the plug-in instance 620 may be to check whether the inventory related to the purchase order is greater than a threshold, and when the inventory is greater than the threshold, the purchasing workflow 610 is terminated through the end part 622.

Therefore, the data combination device 100 and the data combination method of the disclosure may package multiple matching component instances into package data according to the combining instruction, thereby reducing the difficulty of data logic development and improving data reusability. In addition, users may input component descriptions and data types according to different usage environments and situations, thereby generating component instance combinations (i.e., package data) that meet current business scenarios.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A data combination device, comprising:
   a storage device, configured to store a plurality of component instances; and
   a processor, coupled to the storage device and configured to receive a combining instruction,
   wherein the combining instruction comprises a component description and a data type, the processor parses the component description and the data type in the combining instruction,
   wherein the processor obtains a plurality of matching instances corresponding to the component description from the component instances,
   wherein the processor packages the matching instances into package data,
   wherein the package data comprises a directional parameter, and the directional parameter comprises a node parameter and a link parameter,
   wherein the link parameter is related to a link relationship between the matching instances in the package data,
   wherein the component instances are constructed by program codes, and each of the component instances comprises a component structure, and the component structure comprises definition data and link relationships of at least one of part instance, suite instance, task instance, and workflow instance.

2. The data combination device according to claim 1, wherein the component instances comprise at least one of part instance, suite instance, task instance, and workflow instance,
   wherein the suite instance comprises a plurality of the part instances,
   wherein the task instance comprises at least one of the suite instance and the part instance,
   wherein the workflow instance comprises at least one of the task instance, the suite instance, and the part instance.

3. The data combination device according to claim 1, wherein the storage device further stores a plurality of plug-in instances, wherein the processor obtains at least one matching plug-in instance corresponding to the matching instances from the storage device, wherein the processor combines the matching plug-in instance into the package data according to the component description.

4. The data combination device according to claim 2, wherein the storage device stores a component description matching table, the processor sequentially compares the component description and the component instances to obtain the matching instances of the process instance, the task instance, the suite instance, and the part instance that match the component description,
 wherein the processor packages the matching instances and the data type into the package data.

5. The data combination device according to claim 1, wherein the processor executes the package data to generate an execution result of the package data,
 wherein the processor outputs the execution result.

6. The data combination device according to claim 1, further comprising a data interface, wherein the data interface receives the combining instruction,
 wherein the data interface inputs the combining instruction to the processor,
 wherein the data interface outputs the package data and an execution result corresponding to the package data.

7. The data combination device according to claim 1, wherein the processor receives a creation instruction, and the processor generates a new component instance according to the creation instruction, wherein the processor stores the new component instance in the storage device.

8. A data combination method, comprising:
 receiving a combining instruction;
 parsing a component description and a data type in the combining instruction;
 obtaining a plurality of matching instances corresponding to the component description from the component instances; and
 packaging the matching instances into package data;
 wherein the package data comprises a directional parameter, and the directional parameter comprises a node parameter and a link parameter,
 wherein the directional parameter is related to a link relationship between the matching instances in the package data, wherein the component instances are constructed by program codes, and each of the component instances comprises a component structure, wherein the component structure comprises definition data and link relationships of at least one of part instance, suite instance, task instance, and workflow instance.

9. The data combination method according to claim 8, wherein the component instances comprise at least one of part instance, suite instance, task instance, and workflow instance,
 wherein the suite instance comprises a plurality of the part instances, wherein the task instance comprises at least one of the suite instance and the part instance, wherein the workflow instance comprises at least one of the task instance, the suite instance, and the part instance.

10. The data combination method according to claim 8, further comprising:
 obtaining at least one matching plug-in instance corresponding to the matching instances from a storage device, and
 combining the matching plug-in instance into the package data according to the component description.

11. The data combination method according to claim 9, wherein obtaining the matching instances corresponding to the component description from the component instances further comprises:
 sequentially comparing the component description and the component instances to obtain the matching instances of the process instance, the task instance, the suite instance, and the part instance that match the component description,
 wherein packaging the matching instances into the package data further comprises:
 packaging the matching instances and the data type into the package data.

12. The data combination method according to claim 8, further comprising:
 executing the package data to generate an execution result of the package data;
 outputting the execution result.

13. The data combination method according to claim 8, further comprising:
 receiving the combining instruction through a data interface,
 inputting the combining instruction to a processor through the data interface;
 outputting the package data and an execution result corresponding to the package data through the data interface.

14. The data combination method according to claim 8, further comprising:
 receiving a creation instruction;
 generating a new component instance according to the creation instruction; and
 storing the new component instance in a storage device.

* * * * *